(12) United States Patent
Polkowski et al.

(10) Patent No.: US 12,180,349 B2
(45) Date of Patent: Dec. 31, 2024

(54) METHOD FOR GRAPHENE INCORPORATION INTO A RUBBER COMPOUNDING BY USING LIQUID PLASTICIZER ROUTE—LPR METHOD

(71) Applicant: Ford Global Technologies, LLC, Dearborn, MI (US)

(72) Inventors: Rodrigo Denizarte de Oliveira Polkowski, Salvador (BR); Cristiano Grings Herbert, Salvador (BR); Alper Kiziltas, Sarikamis (TR); Deborah Frances Mielewski, Ann Arbor, MI (US); Cristiane Carla Gonçalves, Lauro de Freitas (BR); Cindy Sofia Barrera-Martinez, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 76 days.

(21) Appl. No.: 17/463,478

(22) Filed: Aug. 31, 2021

(65) Prior Publication Data
US 2023/0061187 A1    Mar. 2, 2023

(51) Int. Cl.
| C08K 3/04 | (2006.01) |
| B29C 35/02 | (2006.01) |
| B29C 43/00 | (2006.01) |
| C08K 5/00 | (2006.01) |
| C08L 9/06 | (2006.01) |
| C08L 23/16 | (2006.01) |

(52) U.S. Cl.
CPC .............. *C08K 3/042* (2017.05); *B29C 35/02* (2013.01); *B29C 43/003* (2013.01); *C08K 5/0016* (2013.01); *C08L 9/06* (2013.01); *C08L 23/16* (2013.01)

(58) Field of Classification Search
CPC ...... C08K 3/042; C08K 5/0016; B29C 35/02; B29C 43/003; C08L 9/06; C08L 23/16
USPC ....................................................... 524/495
See application file for complete search history.

(56) References Cited

U.S. PATENT DOCUMENTS

| 8,808,580 B2 | 8/2014 | Plee et al. |
| 10,160,313 B1 | 12/2018 | Herbert et al. |
| 10,166,863 B1 | 1/2019 | Herbert et al. |
| 2016/0053082 A1 | 2/2016 | Samsuri et al. |
| 2017/0260340 A1 | 9/2017 | Ismail et al. |
| 2018/0273736 A1 | 9/2018 | Li et al. |

*Primary Examiner* — Ling Siu Choi
*Assistant Examiner* — Ronald Grinsted
(74) *Attorney, Agent, or Firm* — Burris Law, PLLC

(57) ABSTRACT

A method for producing a rubber composite includes mixing graphene with a liquid plasticizer to create a graphene/plasticizer solution, mixing the graphene/plasticizer solution with solid rubber and curing to form a preform, and shaping and vulcanizing the preform. The graphene/plasticizer solution may be a nonaqueous solution. The present disclosure also relates to a rubber composite part produced by the above-referenced method.

13 Claims, 4 Drawing Sheets

FIG. 1 *PRIOR ART*

METHOD FOR GRAPHENE INCORPORATION INTO A RUBBER COMPOUNDING BY USING LIQUID PLASTICIZER ROUTE—LPR METHOD

FIELD

The present disclosure relates to a method for producing rubber composites and rubber composite parts produced by the same.

BACKGROUND

The statements in this section merely provide background information related to the present disclosure and may not constitute prior art.

Incorporating graphene and/or graphene-based species (e.g., graphene oxide, reduced graphene oxide, graphene nanoplatelets, among others) into rubber can provide improved mechanical, thermal, and electrical properties to create multifunctional rubber materials. Specifically, using graphene and/or graphene-based species as fillers in rubber composites can provide high specific surface area, high thermal and electrical conductivity, mechanical strength, and flexibility, among others.

In automotive applications, rubber composites used for various motor vehicle parts must withstand exposure to current fuel formulations. Particularly, U.S. Pat. Nos. 10,160,313 and 10,166,863 disclose biodiesel resistant polyvinyl chloride/nitrile butadiene (PVC/NBR) rubber compositions, the disclosures of which are incorporated herein in their entireties.

Conventional graphene and rubber composite forming methods have employed latex mixing, melting mixing, or solution mixing techniques. However, these methods are expensive, inefficient, and require large amounts of water and energy. For latex mixing, the machine expense is high when production is on an industrial scale, as ultrasound equipment is required. Additionally, when using melting mixing, graphene nanosheets may agglomerate in the rubber matrix as a result of strong Van der Waals forces and the high viscosity of rubber, thereby making rubbers having unsatisfactory, uneven properties. Methods employing solution mixing use a large amount of organic solvent, which can be difficult and expensive to dispose of or recycle.

As an example, under conventional latex mixing methods for incorporating graphene into rubber composites on a laboratory scale, a six step process employs an aqueous liquid phase of rubber latex to provide dispersion of graphene particles within the liquid phase of rubber latex. Referring to FIG. 1, a method 100 of producing rubber composites includes mixing water and graphene to form a graphene solution at 102. The graphene may include graphene oxide or functionalized graphene. The graphene solution may also include a surfactant. The graphene solution is then stirred with rubber to form a graphene/rubber solution at 104, and the graphene/rubber solution is then sonicated at 106.

Following sonication, the graphene/rubber solution is then coagulated to form a graphene/rubber material at 108. A formic acid solution or a sodium chloride solution may be used to coagulate the graphene/rubber solution. The formic acid solution may be 10% by weight formic acid. The sodium chloride solution may be 5-8% by weight sodium chloride. The graphene/rubber material is then mixed and cured at 110. During this step, open two-roll mill equipment may be used. The curing formula may include 1-3 parts per hundred rubber (PHR) sulfur, 2-5 PHR zinc oxide (ZnO), 2 PHR stearic acid, 1-1.5 PHR 2,20-dithio-dibenzo thiazole, 2-2.5 PHR poly(1,2-dihydro-2,2,4-trimethyl-quinoline), 2-2.5 PHR N-cyclohexyl-2-benzothiazole sulfenamide, and 2-2.5 PHR N-isopropyl-N'-phenyl-p-phenylenediamine, and N-(1,3-dimethylbutyl)-N'-phenyl-p-phenylenediamine.

Finally, the graphene/rubber material is compression molded and vulcanized at 112. The compression molding and vulcanization may be done at a temperature between 140-160° C., at a pressure of 15 MPa, and for between 15-20 minutes.

The present disclosure addresses these concerns and provides a more efficient, less expensive, environmentally friendly, and scalable method of producing rubber composites.

SUMMARY

This section provides a general summary of the disclosure and is not a comprehensive disclosure of its full scope or all of its features.

In one form of the present disclosure, a method for producing a rubber composite includes mixing graphene with a liquid plasticizer to create a graphene/plasticizer solution, mixing the graphene/plasticizer solution with solid rubber and curing to form a preform, and shaping and vulcanizing the preform.

In variations of this method, which may be implemented individually or in any combination: the graphene includes at least one of graphene oxide, reduced graphene oxide, nanoplatelets, nanosheets, functionalized graphene, and graphene derivatives; the liquid plasticizer includes at least one of oils, mineral oils, waxes, fatty acids, salts of fatty acids, aromatic plasticizers, naphthenic plasticizers, paraffinic plasticizers, derivatives of phthalic, adipic, and sebacic acid esters, trichresil phosphates, and diphenylcresyl phosphates; the rubber composite includes 1-50 parts per hundred rubber (PHR) of the graphene/plasticizer solution; the graphene/plasticizer solution is a nonaqueous solution; the method further includes adding auxiliary materials during the mixing of the graphene/plasticizer solution with solid rubber and curing to form the preform, and the auxiliary materials include at least one of antioxidants, antiozonants, curing agents, vulcanization agents, and activators.

In another form of the present disclosure, a method for producing a rubber composite includes mixing graphene with a liquid plasticizer to form a nonaqueous graphene/plasticizer solution, and mixing the nonaqueous graphene/plasticizer solution with solid rubber and curing.

In variations of this method, which may be implemented individually or in any combination: the graphene includes at least one of graphene oxide, reduced graphene oxide, nanoplatelets, nanosheets, functionalized graphene, and graphene derivatives; the liquid plasticizer includes at least one of oils, mineral oils, waxes, fatty acids, salts of fatty acids, aromatic plasticizers, naphthenic plasticizers, paraffinic plasticizers, derivatives of phthalic, adipic, and sebacic acid esters, trichresil phosphates, and diphenylcresyl phosphates; the rubber composite includes 1-50 parts per hundred rubber (PHR) of the nonaqueous graphene/plasticizer solution; the method further includes adding auxiliary materials during the mixing the nonaqueous graphene/plasticizer solution with solid rubber and curing; and the auxiliary materials include at least one of antioxidants, antiozonants, curing agents, vulcanization agents, and activators.

In yet another form of the present disclosure, a rubber composite part is produced by a method including the steps of mixing graphene with a liquid plasticizer to create a graphene/plasticizer solution, mixing the graphene/plasticizer solution with solid rubber and curing to form a preform, and shaping and vulcanizing the preform.

In variations of this composite part, which may be implemented individually or in any combination, the graphene includes at least one of graphene oxide, reduced graphene oxide, nanoplatelets, nanosheets, functionalized graphene, and graphene derivatives; the liquid plasticizer includes at least one of oils, mineral oils, waxes, fatty acids, salts of fatty acids, aromatic plasticizers, naphthenic plasticizers, paraffinic plasticizers, derivatives of phthalic, adipic, and sebacic acid esters, trichresil phosphates, and diphenylcresyl phosphates; the rubber composite part includes 1-50 parts per hundred rubber (PHR) of the graphene/plasticizer solution; the graphene/plasticizer solution is a nonaqueous solution; the method further includes adding auxiliary materials during the mixing of the graphene/plasticizer solution with solid rubber and curing to form the preform; and the auxiliary materials include at least one of antioxidants, antiozonants, curing agents, vulcanization agents, and activators.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
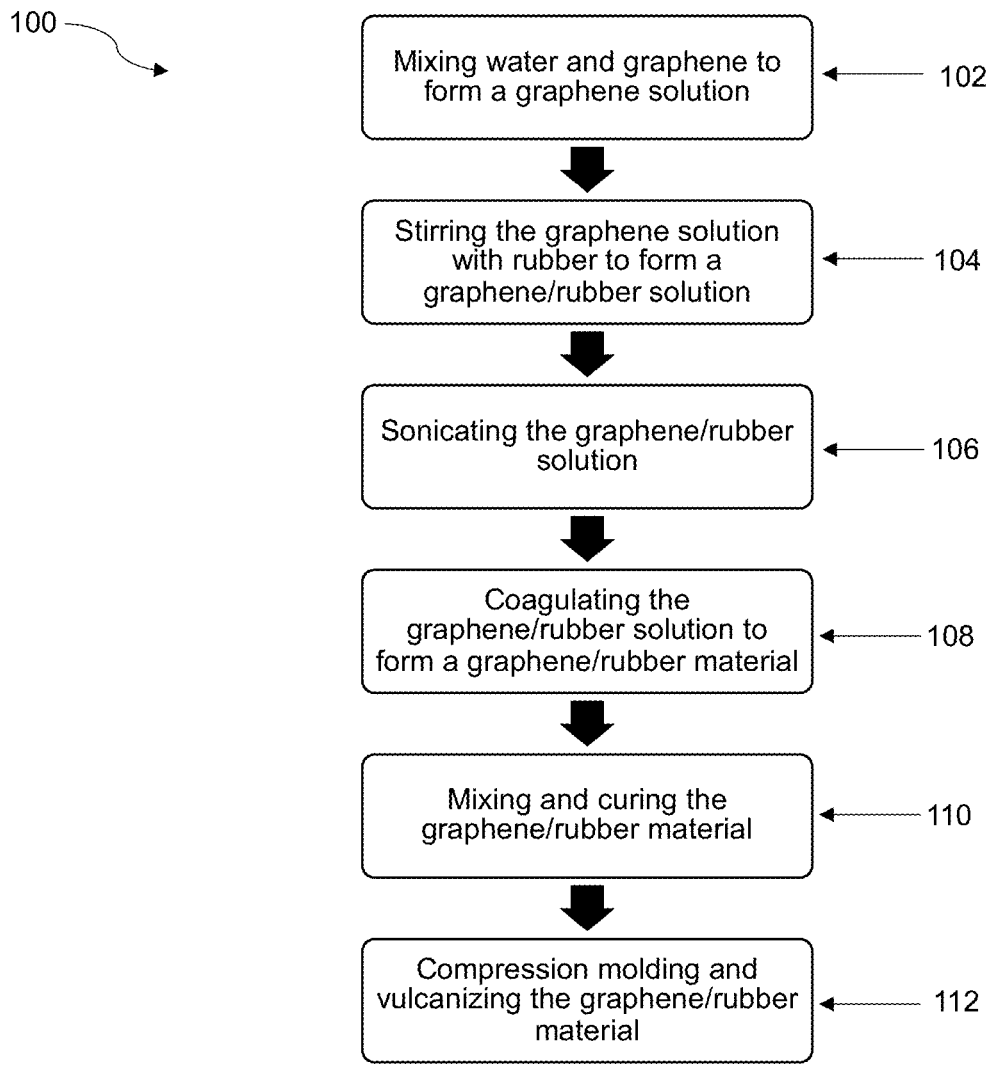
FIG. 1 is a flowchart illustrating a conventional method for producing rubber composites.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used herein, "graphene" or "graphenes" include graphene oxide, reduced graphene oxide, nanoplatelets, nanosheets, functionalized graphene, graphene derivatives, and mixtures thereof, among others. The graphene or graphenes may be electrically conductive or electrically nonconductive depending on the type of graphene or graphenes used. For example, graphene oxide and reduced graphene oxide are electrically nonconductive.

As used herein, "liquid plasticizer" or "liquid plasticizers" include chemicals. Particularly, "liquid plasticizer" or "liquid plasticizers" may include at least one of oils; mineral oils; waxes; fatty acids; salts of fatty acids; aromatic plasticizers; naphthenic plasticizers; paraffinic plasticizers; derivatives of phthalic, adipic, and sebacic acid esters; trichresil phosphates; and diphenylcresyl phosphates. Specific examples of liquid plasticizers include adipates, phthalates, trimellitates, epoxidized soybean oil (ESO), diisononyl phthalate (DINP), dioctyl phthalate (DOP), dioctyl terephthalate (DOTP), dioctyl adipate (DOA), diisononyl adipate (DINA), dibutyl sebacate (DBS), dioctyl sebacate (DOS), diundecyl phthalate (DUP), dibutyl phthalate (DBP), diisodecyl phthalate (DIDP), tri(butokyethyl) phosphate (TBEP), 810TM, tris(2-ethylhexyl) trimellitate (TOTM), tri iso nonyl trimellitate (TINTM), polyisobutylene, vulcanized vegetable oil, Fluibrax Euro 40 (Petrobras), Nytex 4700 (Ninas), Flex NBS 100 (Quantiq), RP1020 (Hall Star), castor seed oil in natura, vegetable oil, soybean oil, and linseed oil, among others.

Surfactants lower surface tension between a liquid and at least one of another liquid, a gas, and a solid. As used herein, "surfactant" or "surfactants" may include cetyltrimethylammonium bromide (CTAB), sodium dodecyl sulfate (SDS), and Pluronic® F127 (available from BASF Corporation), among others. Depending on various factors, such as the type of graphene chosen, a surfactant may not be required to prepare a rubber composite according to the present disclosure.

As used herein, "solid rubber" includes nitrile butadiene rubber (NBR), styrene-butadiene rubber (SBR), ethylene propylene diene monomer (EPDM), and mixtures thereof, among others.

In some aspects, auxiliary materials may be added during a banburying step (as more fully described below). As used herein, "auxiliary materials" or "auxiliary material" include at least one of antioxidants, antiozonants, curing agents, vulcanization agents, and activators.

One optional auxiliary material includes antioxidants. Antioxidants inhibit oxidation of rubber compositions and may be based on phenolics, benzimidazoles, quinolines, phosphites, or amines. Non-limiting examples of antioxidants may include 2,6-di-t-butyl-p-cresol, butylated reaction product of p-cresol & dicyclopentadiene, hindered phenol, 2,2'-methylene-bis-(4-methyl 6-t-butyl phenol), 2,5-di-tert-amyl hydroquinone, 4,4'-butylidenebis (6-tert-butyl-m-cresol), Zn salt of 2-mercapto 4(5)-methylbenzimidazole, 4/5-methyl mercapto benzimidazole, 2,2,4-trimethyl-1,2-hydroquinoline, 2,2,4-trimethyl-1,2-dihydroquinoline, tris-nonylphenyl phosphite, phenyl-a-naphthylamine, octylated diphenylamine, or 4,4'-bis(a,a'-dimethylbenzyl/diphenylamine), or a combination thereof. In one aspect, the rubber composition of the present disclosure may include antioxidants at greater than or equal to about 0 to less than or equal to about 5 PHR. In another aspect, the rubber composition of the present disclosure may include antioxidants at greater than or equal to about 1 to less than or equal to about 4 PHR. In yet another aspect, the rubber composition of the present disclosure may include antioxidants at greater than or equal to about 2 to less than or equal to about 3 PHR.

Another optional auxiliary material includes antiozonants. Antiozonants inhibit degradation of rubber compositions by ozone. Non-limiting examples of antiozonants may include N-isopropyl-N'-phenyl-P'-phenylene diamine, N-(1,3-dimethyl butyl)-N'-phenyl-P-phenylene diamine (6PPD), mixed diaryl-P-phenylene diamine, or bis(1,2,3,6-tetrahydro-benzaldehyde)-pentaerythrityl acetate. In an aspect, the rubber composition of the present disclosure may include antiozonants at greater than or equal to about 0 to less than or equal to about 5 PHR. In another aspect, the rubber composition of the present disclosure may include antiozonants at greater than or equal to about 1 to less than or equal to about 4 PHR. In still another aspect, the rubber composition of the present disclosure may include antiozonants at greater than or equal to about 2 to less than or equal to about 3 PHR.

A further optional auxiliary material includes curing agents. Curing agents enable crosslinking of rubber compositions and may include sulphur sources, peroxides, metal oxides, amines, phenolic resins, carbon-based sources, and silica-based sources, among others. Non-limiting examples of curing agents may include magnesium oxide (MgO), zinc oxide (ZnO), organic peroxide, and dithiodimorpholine (DTDM). In an aspect, the rubber composition of the present disclosure may include curing agent at greater than or equal to about 0 to less than or equal to about 20 PHR. In another aspect, the rubber composition of the present disclosure may include curing agent at greater than or equal to about 2 to less than or equal to about 15 PHR. In a further aspect, the rubber composition of the present disclosure may include curing agent at greater than or equal to about 3 to less than or equal to about 7 PHR.

Yet another optional auxiliary material includes vulcanization agents. Vulcanization agents increase the speed of vulcanization and allow vulcanization to proceed at a lower temperature and with increased efficiency. Vulcanization agents may be based on aldehyde amine, guanidine, thiazole, thiophosphate, sulfonamides, thiourea, thiuram, dithiocarbamate, or xanthates, among others. Non-limiting examples of vulcanization agents include heptaldehyde-aniline condensation product (BA), hexamethylenetetramine (HMT), diphenyl guanidine (DPG), diorthotolyl guanidine (DOTG), mercaptobenzothiazole (MBT), benzothiazole disulfide (MBTS), zinc salt of mercaptobenzothiazole (ZMBT), zinc-O,O-di-N-phosphorodithioate (ZBDP), N-cyclohexyl-2-benzothiazole sulfenamide (CBS), N-tert-butyl-benzothiazole sulfonamide (TBBS), 2-(4-morpholinothio)-benzothiazole (MBS), N,N'-dicyclohexyl-2-benzothiazole sulfenamide (DCBS), ethylene thiourea (ETU), di-pentamethylene thiourea (DPTU), dibutyl thiourea (DBTU), tetramethylthiuram monosulfide (TMTM), tetramethylthiuram disulfide (TMTD), dipentamethylenethiuram tetrasulfide (DPTT), tetrabenzylthiuram disulfide (TBzTD), zinc dimethyldithiocarbamate (ZDMC), zinc diethyldithiocarbamate (ZDEC), zinc dibutyldithiocarbamate (ZDBC), zinc dibenzyldithiocarbamate (ZBEC), and zinc-isopropyl xanthate (ZIX). In an aspect, the rubber composition of the present disclosure may include vulcanization agent at greater than or equal to about 0 to less than or equal to about 20 PHR. In another aspect, the rubber composition of the present disclosure may include vulcanization agent at greater than or equal to about 2 to less than or equal to about 15 PHR. In a further aspect, the rubber composition of the present disclosure may include vulcanization agent at greater than or equal to about 10 to less than or equal to about 12 PHR.

A still further optional auxiliary material includes activators that improve cross-linking reactions of diene rubbers, improve cross-linking density, improve the speed of vulcanization, and improve the resistance of reversion. Activators may be organic or inorganic, or a combination thereof. Non-limiting examples of activators include stearic acid, palmitic acid, lauric acid, zinc salt of stearic acid, zinc salt of palmitic acid, zinc salt of lauric acid, activators based on thiazoles like mercaptobenzothiazole (MBT), benzothiazole disulfide (MBTS), alkaline activators, and zinc oxide (ZnO), among others. In an aspect, the rubber composition of the present disclosure may include activators at greater than or equal to about 0 to less than or equal to about 20 PHR. In another aspect, the rubber composition of the present disclosure may include activators at greater than or equal to about 5 to less than or equal to about 15 PHR. In yet another aspect, the rubber composition of the present disclosure may include activators at greater than or equal to about 7 to less than or equal to about 10 PHR. In one variation of the present disclosure, the rubber composition may include an activator including an inorganic activator at greater than or equal to about 0.1 to less than or equal to about 10 PHR. In other such variations of the present disclosure, the rubber composition may include an activator including an inorganic activator at greater than or equal to about 2.5 to less than or equal to about 7.5 PHR. In even other such variations of the present disclosure, the rubber composition may include an activator including an inorganic activator at greater than or equal to about 4 to less than or equal to about 5 PHR. The inorganic activator may include zinc oxide (ZnO). In another variation of the present disclosure, the rubber composition may include equal amounts of organic activator and inorganic activator. The equal amounts of organic activator and inorganic activator may be at greater than or equal to about 1 to less than or equal to about 5 PHR of organic activator and inorganic activator.

Figure 2:
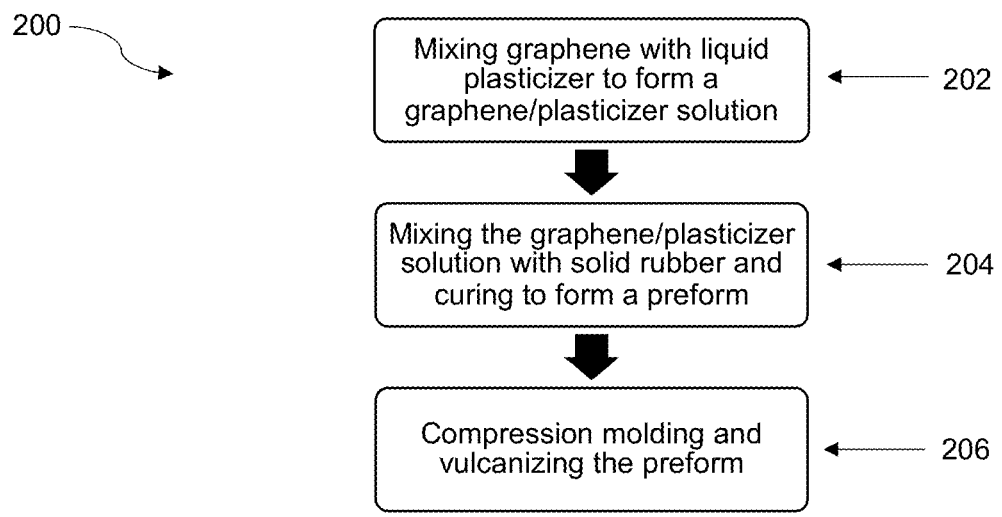
FIG. 2 is a flowchart illustrating a method for producing rubber composites according to one form of the present disclosure.

Referring now to FIG. 2, a method 200 for producing a rubber composite according to one form of the present disclosure includes mixing graphene with liquid plasticizer to form a graphene/plasticizer solution at 202. The graphene may include at least one of graphene oxide, reduced graphene oxide, nanoplatelets, and nanosheets, among others. The graphene/plasticizer solution may be at greater than or equal to about 0.5 wt % to less than or equal to about 2 wt % of graphene and may further include a surfactant. Whether to use a surfactant depends on the graphene and/or liquid plasticizer selected.

The rubber composite may include 1-50 parts per hundred rubber (PHR) of the graphene/plasticizer solution. In other aspects, the rubber composite may include 5-15 parts per hundred rubber (PHR) of the graphene/plasticizer solution. In some aspects and in contrast to the conventional methods for forming rubber composites described above, the graphene/plasticizer solution of the present disclosure may be a nonaqueous solution.

The method then includes mixing the graphene/plasticizer solution with solid rubber and curing to form a preform at 204. The mixing may be done using at least one of banburying and open two-roll mill equipment. The curing formula may include 1-3 parts per hundred rubber (PHR) sulfur, 2-5 PHR zinc oxide (ZnO), 2 PHR stearic acid, 1-1.5 PHR 2,20-dithio-dibenzo thiazole, 2-2.5 PHR poly(1,2-dihydro-2,2,4-trimethyl-quinoline), 2-2.5 PHR N-cyclohexyl-2-benzothiazole sulfenamide, and 2-2.5 PHR N-isopropyl-N'-phenyl-p-phenylenediamine, and N-(1,3-dimethylbutyl)-N'-phenyl-p-phenylenediamine. The curing process may be performed at a temperature of greater than or equal to about 60° C. to less than or equal to about 70° C., with a friction ratio of greater than or equal to about 1.2:1 to less than or equal to about 1.3:1, at a speed of greater than or equal to about 15 rotations per minute (RPM) to less than or equal to about 20 RPM, and for about 20 minutes.

Also at 204, auxiliary materials optionally are added during the mixing of the graphene/plasticizer solution with solid rubber and curing.

The preform is then shaped and vulcanized at 206. The shaping and vulcanization may be carried out at a temperature in the range of about 140-160° C., at 15 MPa of pressure, and for about 15-20 minutes. The shaping may be done by at least one of compression molding, extrusion, transfer molding, and rubber injection molding, among others.

Figure 3:
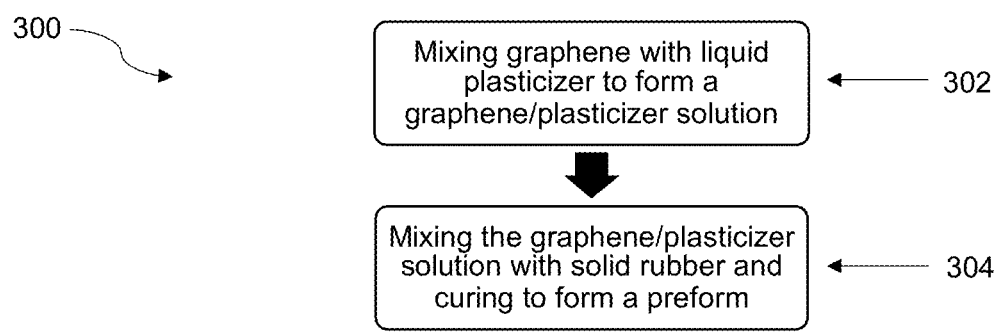
FIG. 3 is a flowchart illustrating a method for producing rubber composites according to another form of the present disclosure.

Referring now to FIG. 3, a method 300 for producing a rubber composite according to another form of the present disclosure includes mixing graphene with liquid plasticizer to form a graphene/plasticizer solution at 302.

The rubber composite may include 1-50 parts per hundred rubber (PHR) of the graphene/plasticizer solution. In other aspects, the rubber composite may include 5-15 parts per hundred rubber (PHR) of the graphene/plasticizer solution. In some aspects and in contrast to the conventional methods for forming rubber composites described above, the graphene/plasticizer solution of the present disclosure may be a nonaqueous solution.

The method also includes mixing the graphene/plasticizer solution with solid rubber and curing to form a preform at 304. The solid rubber may include nitrile butadiene rubber (NBR), styrene-butadiene rubber (SBR), or ethylene propylene diene monomer (EPDM), among others. The mixing may be done using at least one of banburying and open two-roll mill equipment. The curing formula may include 1-3 parts per hundred rubber (PHR) sulfur, 2-5 PHR zinc oxide (ZnO), 2 PHR stearic acid, 1-1.5 PHR 2,20-dithio-dibenzo thiazole, 2-2.5 PHR poly(1,2-dihydro-2,2,4-trimethyl-quinoline), 2-2.5 PHR N-cyclohexyl-2-benzothiazole sulfenamide, and 2-2.5 PHR N-isopropyl-N'-phenyl-p-phenylenediamine, and N-(1,3-dimethylbutyl)-N'-phenyl-p-phenylenediamine. The curing process may be performed at a temperature of greater than or equal to about 60° C. to less than or equal to about 70° C., with a friction ratio of greater than or equal to about 1.2:1 to less than or equal to about 1.3:1, at a speed of greater than or equal to about 15 RPM to less than or equal to about 20 RPM, and for about 20 minutes.

Auxiliary materials may also be added during the mixing of the graphene/plasticizer solution with solid rubber and curing at 304. The auxiliary materials may be at least one of antioxidants, antiozonants, curing agents, vulcanization agents, and activators.

Figure 4:
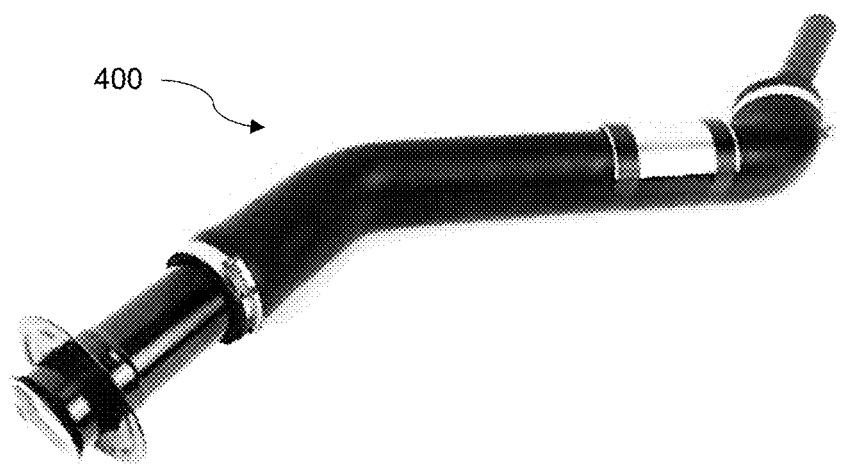
FIG. 4 illustrates an example of a rubber composite part produced by a method of the present disclosure.

Referring now to FIG. 4, the present disclosure also relates to a rubber composite part 400 produced by a method of the present disclosure described above. By way of example, the rubber composite part 400 may be a fuel tube, a heating or cooling line, a seal for a motor vehicle, an air conditioning (AC) rubber line, or fuel rubber hoses. However, the present disclosure is not limited to these applications. The rubber composite part 400 may be produced by mixing graphene with a liquid plasticizer to create a graphene/plasticizer solution.

The rubber composite part may include 1-50 parts per hundred rubber (PHR) of the graphene/plasticizer solution. In other aspects, the rubber composite part may include 5-15 parts per hundred rubber (PHR) of the graphene/plasticizer solution. In some aspects and in contrast to the conventional methods for forming rubber composites described above, the graphene/plasticizer solution of the present disclosure may be a nonaqueous solution.

The method also includes mixing the graphene/plasticizer solution with solid rubber and curing to form a preform. The solid rubber may include nitrile butadiene rubber (NBR), styrene-butadiene rubber (SBR), or ethylene propylene diene monomer (EPDM), among others. The mixing may be done using at least one of banburying and open two-roll mill equipment. The curing formula may include 1-3 parts per hundred rubber (PHR) sulfur, 2-5 PHR zinc oxide (ZnO), 2 PHR stearic acid, 1-1.5 PHR 2,20-dithio-dibenzo thiazole, 2-2.5 PHR poly(1,2-dihydro-2,2,4-trimethyl-quinoline), 2-2.5 PHR N-cyclohexyl-2-benzothiazole sulfenamide, and 2-2.5 PHR N-isopropyl-N'-phenyl-p-phenylenediamine, and N-(1,3-dimethylbutyl)-N'-phenyl-p-phenylenediamine. The curing process may be performed at a temperature of greater than or equal to about 60° C. to less than or equal to about 70° C., with a friction ratio of greater than or equal to about 1.2:1 to less than or equal to about 1.3:1, at a speed of greater than or equal to about 15 RPM to less than or equal to about 20 RPM, and for about 20 minutes.

Auxiliary materials may also be added during the mixing of the nonaqueous graphene/plasticizer solution with solid rubber and curing. The auxiliary materials may be at least one of antioxidants, antiozonants, curing agents, vulcanization agents, and activators.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for producing a rubber composite, the method comprising:
   creating a graphene/plasticizer solution consisting of graphene mixed with a liquid plasticizer;
   mixing the graphene/plasticizer solution with solid rubber and curing to form a preform; and
   shaping and vulcanizing the preform.

2. The method of claim 1, wherein the graphene comprises at least one of graphene oxide, reduced graphene oxide, nanoplatelets, nanosheets, functionalized graphene, and graphene derivatives.

3. The method of claim 1, wherein the liquid plasticizer comprises at least one of oils, mineral oils, waxes, fatty acids, salts of fatty acids, aromatic plasticizers, naphthenic plasticizers, paraffinic plasticizers, derivatives of phthalic, adipic, and sebacic acid esters, trichresil phosphates, and diphenylcresyl phosphates.

4. The method of claim 1, wherein the rubber composite comprises 1-50 parts per hundred rubber (PHR) of the graphene/plasticizer solution.

5. The method of claim 1, wherein the graphene/plasticizer solution is a nonaqueous solution.

6. The method of claim 1 further comprising adding auxiliary materials during the mixing of the graphene/plasticizer solution with solid rubber and curing to form the preform.

7. The method of claim 6, wherein the auxiliary materials comprise at least one of antioxidants, antiozonants, curing agents, vulcanization agents, and activators.

8. A method for producing a rubber composite, the method comprising:

creating a nonaqueous graphene/plasticizer solution consisting of graphene mixed with a liquid plasticizer; and mixing the nonaqueous graphene/plasticizer solution with solid rubber and curing.

9. The method of claim 8, wherein the graphene comprises at least one of graphene oxide, reduced graphene oxide, nanoplatelets, nanosheets, functionalized graphene, and graphene derivatives.

10. The method of claim 8, wherein the liquid plasticizer comprises at least one of oils, mineral oils, waxes, fatty acids, salts of fatty acids, aromatic plasticizers, naphthenic plasticizers, paraffinic plasticizers, derivatives of phthalic, adipic, and sebacic acid esters, trichresil phosphates, and diphenylcresyl phosphates.

11. The method of claim 8, wherein the rubber composite comprises 1-50 parts per hundred rubber (PHR) of the nonaqueous graphene/plasticizer solution.

12. The method of claim 8 further comprising adding auxiliary materials during the mixing of the nonaqueous graphene/plasticizer solution with solid rubber and curing.

13. The method of claim 12, wherein the auxiliary materials comprise at least one of antioxidants, antiozonants, curing agents, vulcanization agents, and activators.

* * * * *